Figure 2:
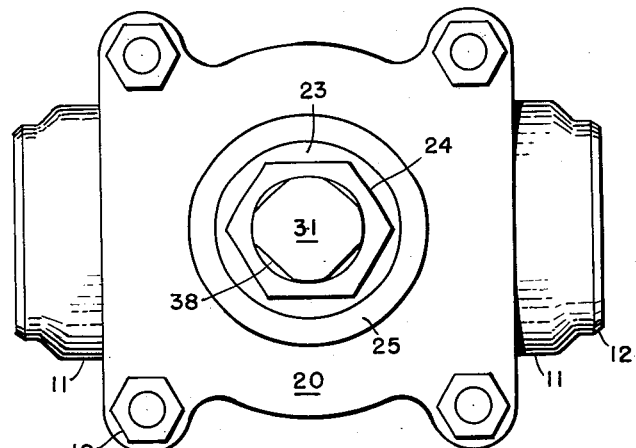

May 12, 1964     J. L. DICKERSON ETAL     3,132,836
ROTARY PLUG VALVE HAVING ADJUSTABLE SEATS
Filed Aug. 25, 1960     2 Sheets-Sheet 1

*INVENTORS*
John L. Dickerson
Benjamin C. Neat

BY

*ATTORNEY*

May 12, 1964    J. L. DICKERSON ETAL    3,132,836
ROTARY PLUG VALVE HAVING ADJUSTABLE SEATS
Filed Aug. 25, 1960    2 Sheets-Sheet 2
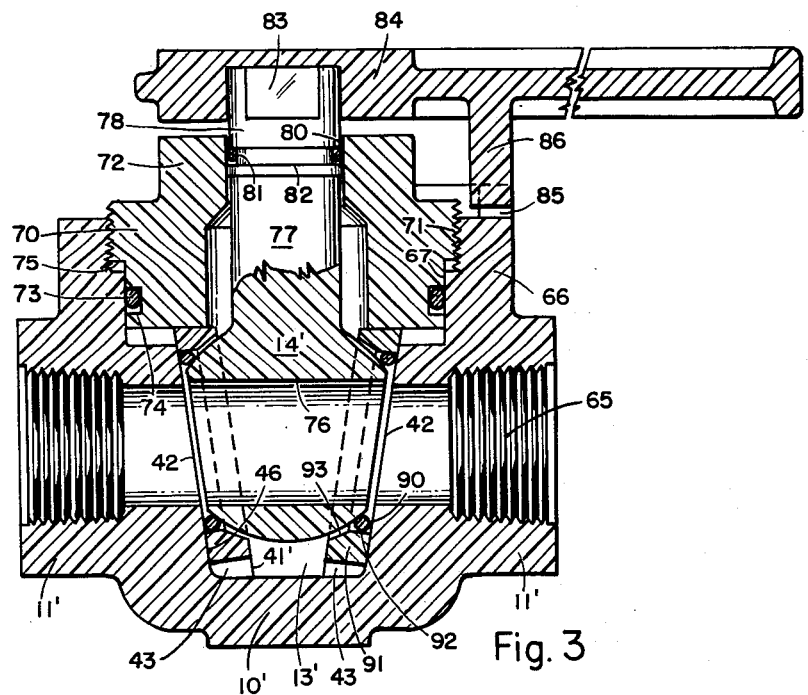
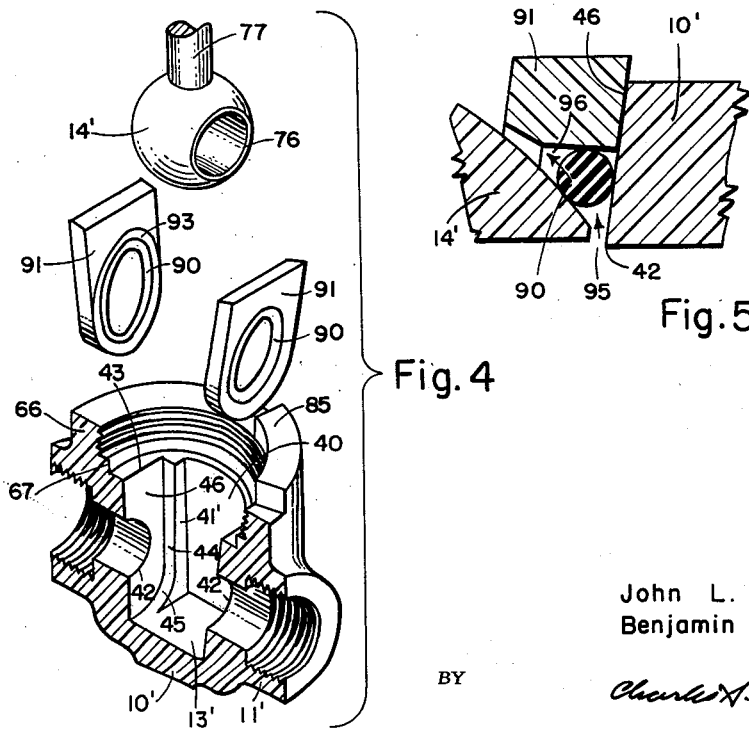
INVENTORS
John L. Dickerson
Benjamin C. Neat
BY Charles N. Campbell
ATTORNEY

United States Patent Office 3,132,836
Patented May 12, 1964

3,132,836
ROTARY PLUG VALVE HAVING
ADJUSTABLE SEATS
John L. Dickerson and Benjamin C. Neat, Louisville, Ky., assignors to Chemetron Corporation, Chicago, Ill., a corporation of Delaware
Filed Aug. 25, 1960, Ser. No. 51,939
10 Claims. (Cl. 251—171)

The present invention relates to valves for controlling flow of fluids, either gaseous or liquid, and more particularly to improvements in design and construction of valves of the kind having a flow controlling element in the form of a rotatable plug and associated sealing means adapted for relatively high pressure service.

A wide variety of valves employing cylindrical, tapered or spherical plugs have been extensively used, but in general the previous forms of such valves have been subject to various disadvantages among which are complex and costly design and construction, lack of ease of operation, unreliability in the maintenance of effective seals over the desired range of operating conditions, excessive wear of relatively movable parts, and difficulties in adjustment and servicing due to either, or both, lack of provision for ready access to the interior parts and necessity to completely break the fluid line in which the valve is installed in order to remove it for servicing.

With both cylindrical and tapered plug valves, great care must be exercised in providing contacting surfaces to fine tolerances in order to insure close fit of the plug in its socket or bore as required for effective sealing. This, of course, increases manufacturing costs. Additionally, the closer the fit for sealing purposes, the greater the torque required for rotating the plug. And, even though the initial plug fit may be sufficient for effective sealing, subsequent wear of the contacting surfaces results in leakage which, in the case of the simpler or basic forms of cylindrical plug valves, necessitates replacement of the plug itself or of the whole valve body.

Tapered plugs, on the other hand, have the characteristic of being self-lapping so as to compensate for variations in size of plug and socket, both initially and as the parts become worn in service. With tapered plug valves, however, the problem is encountered that in addition to relative change in position of the plug and its socket due to wear of their contacting surfaces, there is a tendency for fluid in the line acting against the tapered surface of the plug to force it out of its socket, this unseating action of course being greater for higher line pressures. Hence, in order to accomplish effective sealing and obtain the benefit of the compensating action above referred to, it is necessary or desirable to provide some means for applying axially directed force on the plug to effect tight seating thereof in its socket. Such force applying means should be capable not only of providing the initially required close fit between plug and socket but also of compensating for wear and the above-referred-to tendency toward unseating due to line pressure, which latter may vary over periods of operating service. Various expedients, including screw-down devices, springs and fluid applying means have been employed for this purpose. However, the more effective the action of the axial force applying means in tightly seating the plug so as to avoid leakage, the greater is the frictional resistance to rotation of the plug, sometimes even to the extent of seizing or sticking of the plug. As a result, the application of excessively high torque frequently is required for valve operation. To reduce this torque, various arrangements for introducing lubricant between the surfaces of the plug and its socket, or for lifting the plug during rotation, have been employed, but none of these has proved entirely satisfactory due to either, or both, increased complexity and cost of construction and undesirable effects encountered in operating service.

Another expedient for reducing operating torque while obtaining the desired sealing effectiveness is the employment of some form of auxiliary sealing means constructed and arranged to provide at least one of the surfaces or areas of sealing contact between the valve plug and its socket. In some cases, such sealing means have been in the form of tubular sleeves or liners surrounding the valve plug in its socket. It has been found, however, that for a given size of valve and a given desired effectiveness of sealing, the torque required to operate the plug will be considerably less if the auxiliary sealing means is provided in the form of one or more seat rings arranged to provide an annular area of sealing contact between the plug and its socket around one or more port openings in the valve body. With such rings a concentrated area of contact, approaching line contact, may be obtained for maximum effectiveness of sealing with minimum overall resistance to rotation of the plug. Seat rings of various constructions, and of both metallic and non-metallic materials, have been employed. However, for many applications it has been found most advantageous to employ seat rings constructed of non-metallic materials, of suitable degrees of hardness and resilience, such as vulcanized natural or synthetic rubber, nylon, or one of the fluorine substituted polyethylene compounds such as those known by the trade names "Teflon" (polytetrafluoroethylene) and "Kel-F" (polychlotrifluoroethylene). Teflon is particularly advantageous since, in addition to its inert nature, it has anti-frictional or self-lubricating properties and is slightly and resiliently deformable under moderate pressure whereas, under higher pressures it may be permanently deformed by cold flow into tight sealing engagement with an associated contact surface.

It has been found that significant advantages may be obtained, and many of the previously mentioned disadvantages of cylindrical and tapered plug valves avoided or readily overcome, with the spherical plug or ball type valve employing seat ring sealing elements such as above discussed, and it is this type of valve to which the present invention particularly relates. Maximum sealing effectiveness with low operating torque requirements, as well as other desirable characteristics, may be obtained with much simpler and less costly constructions of such spherical plug valves. Among the reasons for this is that the dimensions of a spherical plug and its receiving socket walls need not be made to such close tolerances as are required in cylindrical and tapered plug valves, thus reducing manufacturing costs. Also, with the spherical plug design, it is simpler to provide full round port openings in the plug, as distinguished from the axially elongated rectangular openings commonly employed in tapered plugs, thereby making it possible to obtain uninterrupted, turbulent free flow of fluid through the valve. A further advantage is that the spherical shape not only inherently reduces surface friction, but also lends itself more readily to the association therewith of seat rings, such as previously mentioned, of simple construction and arrangement capable of providing a concentrated area of sealing contact for maximum sealing effectiveness with minimum overall resistance to rotation of the plug.

Such seat rings, while having to greater or less extent the advantages above set forth when employed in the types of plug valves above referred to, nevertheless are subject to wear or deformation in varying degree, depending upon the particular valve constructions, the nature of the fluids to which they are subjected and other conditions. For this reason, and also to permit proper control of the sealing contact pressure to take care of possible irregularities in construction of valve parts and variations in operating conditions, such seat rings generally are provided in forms such that they are separable from the valve plug and valve body and removable from the latter for replacement purposes. Previous forms of plug valves employing such seat rings, however, in general have been subject to certain important disadvantages. For example, valve constructions frequently are such that access to the seat rings for adjustment or replacement is possible only when the valve casing is dismantled to an extent that requires complete removal of the valve from the fluid line, thereby resulting in a break in the line. Also, in some cases, no provision is made for either manual adjustment or self-adjusting action to compensate for wear of the seat rings or other parts or for changes in operating conditions after initial assembly of the valve. In other cases, although springs or other means may be provided for accomplishing some degree of self-adjusting action, this is found to be inadequate to maintain proper sealing effectiveness of the seat rings under varying conditions of operation.

Desirably, therefore, there should be provided means by which the sealing contact pressure may be adjusted in accordance with conditions of service initially encountered, and which means also may be utilized to adjust such pressure to compensate for subsequent changes in operating conditions, such as due to wear of the parts or variation in line pressure. Additionally, such adjusting means should be simple, easy to operate, and readily accessible without the necessity for removing the valve from the fluid line. Although as previously indicated, some forms of plug valves heretofore available have had various means capable of affording some degree of compensating action, or adapted for some degree of adjustment, to control the sealing contact pressure, nevertheless such means as heretofore provided have in general failed to have one or more of the desirable characteristics above set forth.

Accordingly, a general objective of the present invention is the provision of improvements in design and construction of plug valves by means of which the aforesaid desirable characteristics are obtained while avoiding the previously mentioned disadvantages of prior forms of such valves.

Another important object of the invention is the provision of a spherical plug, or ball type, valve of improved design and construction which comprises in its entirety only a small number of simple, sturdy component parts, is easy and economical to manufacture, insures smooth, low-torque plug turning action at all times, is capable of affording and maintaining a high degree of sealing effectiveness over long periods of service, and permits quick, easy access to working parts for on-the-line servicing.

Another and more specific object is the provision, in a spherical plug valve having seat ring type sealing elements, of improved construction and arrangement of the seat rings and other parts such that access to the interior of the valve body and removal and replacement of the seat rings may be accomplished quickly, easily and without the necessity for removing the valve from the fluid line in which it is installed.

A further specific object is the provision of a spherical plug valve, such as above referred to, having simple and easily operable means, readily accessible on the exterior of the valve, for controlling and adjusting the sealing pressure of the seat rings at the time of initial assembly and which also permits easy readjustment of such pressure when necessary to compensate for wear and variations in operating conditions during service.

Still another object is the provision of certain improvements in design of spherical plug valves which are especially suitable for, and afford significant advantages in, all-plastic constructions, i.e., constructions in which all parts of the valve are made of one or more plastic materials.

Various other objects and advantages, and the details of what are considered to be novel and to constitute the present invention, will be apparent from the following description and the claims appended thereto, taken in conjunction with the accompanying drawings wherein are illustrated exemplary embodiments of the invention. In the drawings, FIG. 1 is a longitudinal sectional elevation of one such embodiment which is particularly adapted for construction of metal, although it also may be advantageously constructed in whole or in part of suitable plastic material if desired, while FIG. 2 shows a top plan view of the valve of FIG. 1; and FIG. 3 illustrates, in longitudinal sectional elevation, another embodiment which is particularly adapted for all-plastic construction, although if desired it may be made in whole or in part of metal, while FIG. 4 is an exploded perspective view, partially in section, of the principal parts of the valve of FIG. 3, and FIG. 5 shows an enlarged section of a detail of that valve.

Although directional terms such as top, bottom, vertical, horizontal, and the like are used for convenience in the ensuing description, it is to be understood that the invention in no way is limited to any particular positional disposition of valves embodying the invention.

Figure 1:
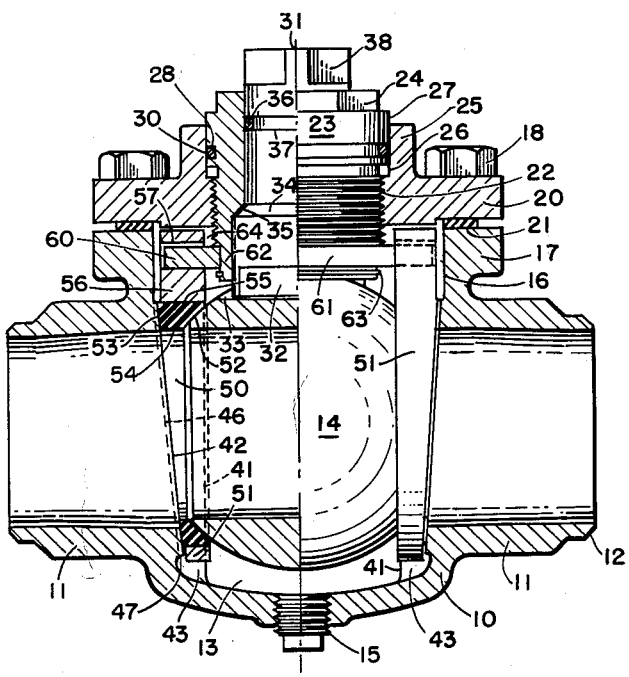

Referring first to the embodiment of FIGS. 1 and 2, the valve therein illustrated includes a body 10 having tubular extensions 11, 11 adapted to provide inlet and outlet ports or flow passages for connection with a fluid line. The ends of these extensions are shown as being suitably formed, including beveling as indicated at 12, for welding to the pipe or conduits of such line, but they may be flanged, or externally or internally threaded, or provided with smooth socket bores, depending upon the kind of line connection required or desired. The interior of body 10 is formed to provide a valve chamber 13 adapted to serve as a socket for a valve plug 14, hereinafter described. For purposes of cleaning out or draining chamber 13, the bottom of the valve body may have an opening closed by means of a screw threaded drain plug as indicated at 15. The top of the valve body is formed to provide an access opening 16 having a flanged rim 17 to which may be attached, by means of bolts or cap screws 18, a flanged cap or bonnet 20 for closing the access opening. Desirably, suitable sealing means, such as the gasket indicated at 21, are provided to seal the joint between the valve body and bonnet.

In the embodiment of FIGS. 1 and 2, the bonnet 20 has a central bore, the lower portion of which is threaded as indicated at 22 for receiving a screw threaded adjusting nut 23, the top portion 24 of which nut is suitably formed, as best seen in FIG. 2, for engagement by a wrench to turn the nut. The upper part of the bore in bonnet 20, defined by an upstanding annular flange 25, is counterbored as shown at 26 to receive an enlarged annular section 27 of adjusting nut 23. This enlarged section has a circumferential groove 28 for a packing or gasket 30 which may be of any suitable form and material, but which preferably is in the form of an O-ring comprised of Teflon or synthetic rubber. The bottom of counterbore 26 serves as a stop for engagement by the lower face of enlarged section 27 to limit the downward movement of nut 23, thereby to prevent the exertion of excessive pressure on the seat rings and other parts later described, and also to prevent excessive misalignment of the plug bore and valve body ports during adjustment of sealing pressure as hereinafter explained.

For rotation of ball 14, there is provided a stem 31 which is rotatably disposed in a central bore in adjusting nut 23 and the lower end of which stem has a rectangular projection 32 formed for sliding fit in a transverse keyway slot 33 in the upper part of the ball. This connection permits a small amount of relative movement, in a vertical direction, between the stem and ball, so that the ball is free to move relative to the valve body and bonnet to a limited extent which, however, is sufficient for the adjusting action hereinafter described. When the valve parts are assembled as illustrated, disengagement of the stem from the ball is prevented by engagement of tapered bearing surface 34, on an enlarged section of the stem, with a corresponding tapered bearing surface 35 disposed at the top of a counterbore provided in the lower end of nut 23. Any suitable form of packing or gasket may be provided to effect a seal between stem 31 and nut 23, there being provided in the illustrated embodiment an O-ring 36 of Teflon or synthetic rubber disposed in a circumferential groove 37 in the stem. The top of the stem is suitably formed, as indicated at 38, to receive a wrench for turning the stem and thereby effecting rotation of ball 14. If desired, there may be provided a wrench of the form illustrated in FIG. 3, with suitable cooperating stop means on the valve body, also as illustrated in FIG. 3, for purposes of determining the desired 90° rotation of the ball.

The form of the valve chamber 13 of the embodiment of FIGS. 1 and 2 includes, for purposes of the present invention, certain basic features which also are present in the embodiment illustrated in FIGS. 3–5. Hence, in the following description of those features, reference will be made to the exploded perspective view of FIG. 4 as well as the showing of FIG. 1. From those figures it will be seen that the horizontal dimensions of the chamber 13 of FIG. 1 and of the chamber 13' of FIG. 4 are larger at the top than at the bottom, thereby providing an upwardly expanding wedge-shaped socket for the spherical plug or ball and its associated seat rings hereinafter described. The walls of the chamber on the closed sides of the valve body, one of which is indicated at 40 in FIG. 4, preferably are curved to conform at least approximately with the curvature of the spherical plug or ball. On the other hand, the walls 41 of the embodiment shown in FIG. 1, and the walls 41' of the embodiment shown in FIG. 4, into which open the ports 42 at the inner ends of the valve body extensions 11 and 11', respectively, lie in planes which extend transversely of those ports. The plane of each wall 41 of the embodiment of FIG. 1 extends vertically at right angles to the axis of the flow passages in said valve body extensions; whereas the plane of each wall 41' of the construction shown in FIG. 4 extends at an angle to such vertical plane as will be explained more fully hereinafter. Each of the walls 41 and 41' has formed therein an inwardly and upwardly opening recess 43 having vertically extending side walls 44, a bottom wall that may curve inwardly as indicated at 45, and a back or bearing wall 46, the whole, or at least the main part, of which wall 46 comprises a smooth, flat surface inclined at an angle to a vertical plane extending at right angles to the axis of the main flow passages of the valve. The pairs of oppositely disposed walls 46 in both embodiments slant away from each other in an upward direction, but the angle of inclination of these walls with respect to such vertical plane in each embodiment should be the same. This angle is not critical and may be in the order of from about 5° to 10°, more or less. In the case of the embodiment shown in FIG. 1 the recesses 43 become progressively shallower toward the bottom, due to the inclination of back walls 46 relative to the vertical planes of walls 41. The back walls 46 in each embodiment may be smooth right up to the edges of ports 42 opening thereinto, as in the construction of FIGS. 3, 4, or a slightly raised annular bearing seat as indicated at 47 in FIG. 1, may be provided around each of the ports. This last-mentioned detail, however, is not critical to the present invention but rather is a matter of choice, depending to some extent upon the kind of material used in construction of the valve body.

The above-described recesses 43 are designed to accommodate sealing devices for cooperation with the valve plug, and the details of which devices now will be described. First, as employed in the embodiment of FIGS. 1, 2, each of the sealing devices comprises a seat ring 50, for engagement with the ball 14, and a retainer element 51 for receiving the ring 50. Each ring 50 may be comprised of suitable resilient and/or deformable material, such as synthetic rubber or Teflon, preferably the latter due to its anti-frictional or self-lubricating properties hereinbefore referred to. This ring, in the embodiment of FIG. 1, varies in width from a relatively narrow cross-section at the bottom of the recess 43 in which it is disposed to a somewhat wider cross-section at the top of this recess. This cross-section of the ring throughout is of somewhat trapezoidal form, including a front surface 52 which is initially flat for annular line contact with the spherical surface of ball 14, a flat rear surface 53 for engagement with bearing seat 47 around one of the ports 42, an inner cylindrical surface 54 of approximately the diameter of said port, and an outer cylindrical surface 55 adapted to engage the inner cylindrical surface of a receiving opening in retainer element 51. Preferably, as shown in FIG. 1, the width of seat ring 50 at any given location around its circumference is greater than the width of its associated retainer element 51 at the same location. Moreover, the outside diameter of ring 50 preferably should be such that, when not subjected to the ultimate high compressive forces for sealing under operating conditions, the ring 50 fits relatively loosely, at least slidably, within element 51. By virtue of the two features just mentioned, it is assured that the resilient or deformable ring 50, rather than the element 51 which is relatively rigid as described below, will be forced by ball 14 into effective sealing engagement with the cooperating seating surface of the valve body. Otherwise, the force exerted by ball 14 may be dissipated in producing pressure engagement, ineffective for proper sealing, between element 51 and the valve body without accomplishing the desired effective sealing by the seat ring 50.

The retainer element 51 of each sealing device is of rigid construction, being comprised of metal, as indicated in the drawings, or other suitable material, such as unplasticized polyvinyl chloride. One purpose of this ring, of course, is to reinforce its associated seat ring 50 and prevent undesirable stretching or distortion of the latter when subjected to the relatively high pressures required for effective sealing. Another function of element 51, in addition to serving as a carrier for ring 50, is to provide for control and adjustment of the position of ring 50 and thereby the sealing pressure between that ring, ball 14 and body bearing seat 47. To this end, each element 51 is provided with an upwardly extending portion 56 having a slot 57 for receiving a projection 60 forming part of an operating element 61. This operating element may be of generally disk-like form, having two such projections 60 extending horizontally in opposite directions for engagement respectively with the two retainer elements 51 of the sealing devices 50, 51 disposed on opposite sides of ball 14. Element 61 also has a central opening for mounting the element on a lower reduced-diameter portion 62 of adjusting nut 23. A lock ring 63 around the lower end of nut 23 is provided for retaining element 61 on the nut, but the fit between the nut and element 61 is sufficiently loose to permit rotation of the nut relative to element 61.

By virtue of the construction just described, control or adjustment of the sealing pressure may be accomplished at any time, either when the valve is initially assembled or at any subsequent time during its operation, by operation of adjusting nut 23 from the exterior of the valve by means of a wrench applied to the operating head 24 of the nut. This is particularly advantageous when the valve is installed in a fluid line, since it enables such adjustment to be accomplished without the necessity for removal of the valve from the line or dismantling of the valve. If it is desired at any time to increase the sealing pressure between seat rings 50 and ball 14, and between the seat rings and bearing seats 47 around ports 42, nut 23 is turned so as to cause it to move in a downward direction. As a result, the projections 60 of operating element 61 apply a vertically downward force on retainer elements 51 and thence to seat rings 50. Due to the fact that the backwalls 46 of the recesses 43 converge toward each other in a downward direction, the rings 50 become wedged with increasing pressure between ball 14 and bearing seats 47. Any desired pressure for most effective sealing thereby may be provided. Thus, the degree of sealing effectiveness may be controlled for the operating conditions initially to be expected. Then, in the event the sealing effectiveness should become decreased during subsequent operation, by reason of wear of any of the contacting surfaces, increase in line pressure, or other cause, the sealing pressure on seat rings 50 may be readily readjusted for maximum effectiveness, merely by rotation of adjusting nut 23. It will be noted that recesses 43 are sufficiently deep to prevent bottoming of the sealing devices against the bottom of the valve chamber, thereby to assure sufficient clearance to provide for the normal range of adjusting movement of the sealing devices as herein described. Such provision for controllable adjustment of the sealing pressure by manual operation from the exterior of the valve at any time during operating service has marked advantages over springs or other self-adjusting means such as have been provided in some cases in the past. Such last-mentioned expedients may prove to be undependable in maintaining desired sealing effectiveness during anticipated conditions of operation, and in any event are not subject to controlled readjustment to compensate for wear or unanticipated changes in operating conditions.

A further important feature of the described construction is that the controlling or adjusting force, produced by turning of nut 23, is applied to seat rings 50 through operating element 61 and retainer elements 51, rather than through ball 14. This is accomplished, in the embodiment of FIGS. 1, 2, by providing sufficient clearance between tapered surfaces 34 and 35 of stem 31 and nut 23, respectively, and between the lower end of stem projection 32 and the bottom of slot 33 in the ball, so that downward movement of nut 23 will not exert force directly on the ball. If adjustment were accomplished by such force directly on the ball, there would be produced components of force directed generally radially of the ball which, particularly around the lower portions of rings 50, would tend to compress and distort these rings and introduce frictional resistance to downward even adjusting movement of the rings. Expressed in another way, a considerable portion of the adjusting force, if exerted directly on the ball, would be dissipated in distortion of rings 50 and creation of frictional resistance to movement of these rings in their recesses, and such action would be more pronounced toward the bottoms of the rings, resulting in a high degree of non-uniformity of loading and unevenness of application of adjusting force on the rings. In contrast, with all of the adjusting force exerted directly downward on the retainer elements 51, as in constructions in accordance with the present invention, the tendency toward undesirable distortion of seat rings 50 is greatly lessened, there is less frictional resistance to movement of the rings in their recesses, and the force required to effect the ultimately desired sealing pressure is smaller and more uniformly and evenly applied.

As previously indicated, the bottom of counterbore 26 serves as a stop to limit downward movement of nut 23 so as to prevent exertion of excessive pressure on the sealing device assemblies 50, 51. On the other hand, inadvertent removal of nut 23 from bonnet 20 is prevented by engagement of the tops of elements 51 with the bottom face of the bonnet. Also, inadvertent removal of stem 31 is prevented by engagement of the two tapered bearing surfaces 34 and 35. With the described construction, it is possible, although not necessary, to reduce the sealing pressure between ball 14 and seat rings 50 to facilitate rotation of the ball from its illustrated open position to closed position (90° in either direction from the open position), or vica versa. This may be accomplished by a double-wrenching procedure wherein one wrench is applied to the head of nut 23 to turn it in a direction to cause upward movement of operating element 61, thereby slightly lifting the sealing devices 50, 51, clearance space 64 being afforded to permit such operation. This also will slightly lift ball 14 and will reduce the wedging action, and thereby the pressure, on the seat rings 50 between the ball and bearing seats 47. Thereupon a second wrench may be applied to the head 38 of stem 31 to rotate the ball, after which nut 23 may be turned downwardly to reestablish the sealing pressure on the ball in its new position, it being understood that the sealing devices will be equally effective in preventing leakage of fluid around the ball in either open or closed position. Normally, however, relief of the sealing pressure for rotation of the ball should be unnecessary since the described constructions inherently afford low friction and ease of turning, especially if the seat rings are made of anti-frictional material such as Teflon.

As will be seen from the drawings, ball 14 has a full round, cylindrical flow opening in order to obtain unimpeded flow characteristics. Desirably, the diameter of this opening should be at least as great as the internal diameter of the pipe or conduits with which the valve is to be connected so as to assure uninterrupted, turbulent free flow of fluid through the valve, and, in order to avoid the necessity for extremely close dimensional tolerances, the diameter of the opening in the ball may be made somewhat larger than that of such pipe or conduits. This is especially important in valves such as herein described, due to the fact that adjusting movement of the plug in a direction transverse to the axis of the inlet and outlet openings of the valve may cause the flow opening in the plug to be out of axial alignment with the connected pipe or conduits under some conditions. In the embodiment of FIGS. 1, 2, the flow passages in valve body extensions 11, 11 are made to increase in diameter inwardly to the ports 42 so as to maintain smooth flow notwithstanding small lateral displacements of the ball in the course of adjustments of the sealing pressure. The engagement of enlarged section 27 of nut 23 with the bottom of counterbore 26 also serves to prevent excessive misalignment of the bore in the ball with respect to ports 42.

Valves embodying the present invention, particularly when the housing components are constructed of metal or other high strength material, are particularly well adapted for service under relatively high pressure conditions, in the order of several thousand pounds p.s.i. Among the reasons, as will be evident from the foregoing description, is the fact that relatively large force may be exerted by the adjusting nut on the sealing devices so that the resulting wedging action is capable of affording a high sealing pressure between the seat rings and the contacting surfaces of the ball and valve body. Moreover, as previously explained, this is subject to control and readjustment to maintain a high sealing effectiveness during operation. With seat rings of the O-ring type, such as employed in the embodiment hereinafter described, the inherent action of such O-rings further increases the high pressure sealing characteristics of valves embodying the present invention.

A further important feature of such valves, as previously indicated, is that they are designed and constructed so as to afford easy access to the interior thereof, in the event the seat rings 50 become worn or deformed during extended service to such extent that maintenance of effective seals no longer can be accomplished by turning down the adjusting nut 23. In the embodiment of FIGS. 1, 2, such access is obtained by unscrewing bolts or cap screws 18 and removing bonnet 20. This permits adjusting nut 23, operating element 61, both sealing devices 50, 51 and ball 14 to be easily removed as a unitary assembly through the enlarged access opening 16 in the top of the valve body. Thereupon, the old seat rings 50 may be slid out of the openings in retainer elements 51 and new seat rings installed in those openings, either with or without removal of the retainer elements from the ends of operating element 61. Then the above-mentioned assembly of parts may be reinserted in valve chamber 13, the seat rings and their retainer elements being held against the ported sides of ball 14 to facilitate such insertion, after which bonnet 20 may be secured in place by means of the bolts or cap screws 18, and initial adjustment of the sealing pressure of seat rings 50 for anticipated operating conditions may be accomplished by rotation of nut 23 as previously described. It is emphasized that all of this may be accomplished quickly and easily, and without the necessity for disturbing the connections between the valve body extensions 11 and the pipe or conduits of the fluid line in which the valve is installed.

As previously indicated, the embodiment of FIGS. 3–5 has certain basic features of construction which, although differing in minor and relatively unimportant details, are fundamentally the same as in the embodiment of FIGS. 1, 2. Since the previous explanation of these features, in the course of the description of the embodiment of FIGS. 1, 2, is likewise applicable to the embodiment of FIG. 3–5, only such part of that explanation as will be required for a full understanding of the latter embodiment will be repeated in the ensuing description.

The valve illustrated in FIGS. 3–5 is particularly adapted and designed for all-plastic construction, i.e., having all parts made of plastic material possessing the desired properties of strength, rigidity and resistance to heat and chemical attack. It has been found that unplasticized polyvinyl chloride, commonly referred to as "U.P.V.C.," and chlorinated polyether materials such as those sold under the trademark "Penton," are particularly well suited for the purpose. As will be seen from FIGS. 3 and 4, the embodiment therein illustrated requires only a very few parts, and all of the parts are of simplified construction and designed for production by injection molding. The body part 10' is of one-piece construction and has tubular extensions 11', 11' at opposite ends to provide inlet and outlet ports or flow passages for connection with a fluid line. The ends of these extensions are shown as being internally screw threaded, as indicated at 65, for screw threaded connection with the pipe or conduits of such line. However, if desired these extensions may be externally threaded, or may be provided with internally smooth sockets for solvent cement joining to such pipe or conduits, or may be flanged, or formed as shown in FIG. 1 to permit plastic welding. The interior of body 10' is formed to provide a valve chamber 13' adapted to serve as a socket for receiving the spherical plug or ball 14'. As previously described, the two opposite walls 41' of this socket which surround and extend transversely to the ports 42 have inwardly and upwardly opening recesses 43. Each of these recesses has vertically extending side walls 44, a bottom wall that curves inwardly as indicated at 45, and a back wall 46 which comprises a smooth, flat bearing surface inclined at an angle to a vertical plane extending at right angles to the axis of the flow passages in extensions 11', 11'. The direction of inclination is such that walls 46 converge downwardly toward each other, and the angle of inclination is the same for both walls, being in the order of from about 5° to 10°, more or less. In this embodiment, the chamber wall 41' at the front of each recess 43 extends at the same angle of inclination to the vertical as does the back wall 46, and each back wall 46 is smooth right up to the edge of the port 42 which opens into it, although a raised bearing seat may be provided around each port, as in the first described embodiment, or the rims of the ports may be provided with flat or curved bevels if desired.

The top of valve body 10' has an integral upwardly projecting annular flange or rim 66 formed and dimensioned to provide an enlarged access opening 67 communicating with the top of upwardly flaring chamber 13'. In the presently described embodiment, this opening is closed by a cap nut or bonnet nut 70 which is externally screw threaded for engagement with the internally screw threaded counterbore 71 in the upper part of rim 66. This cap nut, of unitary construction, serves the dual purpose of acting as a bonnet to close the top of the valve and as an adjusting nut for controlling the sealing pressure of the sealing devices described below. The upper part 72 of the cap nut is formed, similarly to the upper part 24 of the adjusting nut 23 shown in FIG. 1, to receive a wrench for turning the cap nut. In order to seal the joint between the cap nut and the valve body, any suitable form of packing or gasket may be employed, such as, for example, an O-ring 73 of synthetic rubber, Teflon or other suitable material, disposed in a circumferential groove 74 in the periphery of the cap nut. It will be noted that the cap nut has an enlarged portion on which are formed the threads for engagement with the internally threaded counterbore 71 of the valve body rim 66. The bottom of this counterbore serves as a stop for engagement by the lower face 75 of the enlargement on the cap nut to limit downward movement of the cap nut and thereby prevent development of excessive pressure on the sealing devices hereinbelow described, as well as to prevent excessive misalignment of the bore 76 in ball 14' with respect to ports 42 during adjustment of the sealing pressure as described below.

In order to insure uninterrupted, turbulent free flow through the valve, notwithstanding vertical displacement of ball 14' so that its full round cylindrical bore 76 is not in exact axial alignment with ports 42, the diameter of the bore is made somewhat larger than that of the ports, as will be best seen in FIG. 3. For simplicity of construction and to facilitate production, ball 14' of the presently described embodiment is formed with an integral stem 77, the upper part of which has a portion 78 of enlarged diameter which passes through and is guided by an internal bearing bore 80 in the upper part of cap nut 70. Stem portion 78 is axially slidable in bore 80 so that the ball is free to move relative to the valve body and cap nut, the extent of such movement being controlled by the action of the sealing devices hereinafter described. Suitable packing, such as an O-ring 81, of synthetic rubber, Teflon or other suitable material, disposed in a circumferential groove 82 in the upper part of stem 77, is provided for sealing the junction between the stem and cap nut 70. The top of the stem is suitably formed, as indicated at 83, to accommodate a wrench 84 for rotating the stem and thereby ball 14'. For purposes of limiting the opening and closing movement of the ball, there may be provided two upwardly projecting stops on the top rim 66 of the valve body, one of these being shown at 85 in FIGS. 3 and 4 and a like one being located on the diametrically opposite side of the rim. These stops are arranged to be engaged by a depending projection 86 on the handle of wrench 84 to limit movement of the ball to 90° rotation to and from its illustrated open position. It will be understood that when the ball is rotated to its closed position, its bore 76 will be at right angles to the position illustrated and the ball will completely block flow of fluid between ports 42 provided effective sealing means, such as herein described, are provided between the ball and the valve body around ports 42. Such sealing means also will prevent undesirable leakage around the ball into the valve chamber when the ball is in its open position as illustrated.

In order to accomplish such sealing action in the presently described embodiment, there are provided two sealing devices, each of which comprises a seat ring 90 and a carrier or retainer element 91. In this embodiment, each of the seat rings preferably is in the form of an O-ring and is composed of any suitable resilient and/or deformable material, such as synthetic rubber or Teflon.

It has been found that Teflon is particularly advantageous because of its inert nature, its anti-frictional or self-lubricating properties, and the fact that it is slightly and resiliently deformable under moderate pressures. Retainer elements 91 are formed, as will be seen best in FIG. 4, so as to fit slidably into the recesses 43 in the valve body, and, in an all-plastic valve construction, preferably are composed of suitable plastic material having the required rigidity to support and retain the seat rings 90. In most cases, it is advantageous to employ the same material for the retainer elements as is employed for construction of the valve body. Each of the retainer elements has a central bore 92 of proper diameter to slidably receive its associated O-ring when the latter is in unstressed condition and which bore, on the side of the retainer element which is adapted to face ball 14', flares outwardly as indicated at 93 so as to avoid contact of the retainer element with the ball while at the same time enabling the retainer element to be of sufficient thickness and strength to properly serve its function of supporting and reinforcing its associated O-ring. By supporting the O-rings so that they may move axially relative to their associated retainer elements, it is assured that the sealing pressure producing forces will be properly exerted in such manner as to effect the desired sealing contact of the O-rings against recess back walls 46, while avoiding application of such forces to the retainer elements in a manner to cause binding of the latter against walls 46. In contrast, if the O-rings were fixedly disposed in the retainer elements, such forces might be dissipated through the O-rings to the retainer elements so as to cause excessive pressure of those elements on walls 46, with little or no sealing pressure contact of the O-rings against walls 46.

It will be noted that the construction of the presently described embodiment has the important advantage that it makes possible the employment of standard forms of O-rings, of uniform cross-section throughout, such as are common and readily obtainable on the market, thus eliminating the necessity of obtaining specially designed and therefore more costly forms of seat rings. To accomplish this, ball 14' is so formed that the openings at the opposite ends of its bore 76 lie in planes which are inclined, relative to a vertical plane extending at 90° to the axis of the flow passages in the valve body, at the same angle that the recess back walls 46 are so inclined. Also, the planes of said openings converge toward each other in a downward direction so that, as shown in FIG. 3, the cross-section of the ball, taken in a vertical plane extending parallel to the axis of bore 76, is somewhat wedge-shaped. Thus, with the ball in the valve open position as illustrated, the seat ring contact surface on the ball surrounding the rim of the opening at each end of bore 76 extends at a uniform spacing with respect to the opposed recess back wall 46 throughout the circumferential extent of that contact surface. As a result, uniform sealing pressure is obtainable around ports 42 with O-rings of uniform cross-section, notwithstanding the wedge-shaped configuration of the ball socket. In order that the retainer elements 91 may properly support the O-rings and at the same time remain free of contact with the ball, and to simplify construction, it is preferable that the retainer elements also be of uniform face-to-face thickness.

With the parts assembled as shown in FIG. 3, the sealing pressure on the seat rings may be controlled by turning bonnet nut 70. When screwed downwardly, the bottom of this nut exerts force directly on the top of retainer elements 91 and tends to force them and their associated seat rings 90 downwardly in the recesses 43. As in the first-described embodiment, the resulting wedging action due to the inwardly slanting recess back walls 46 subjects the seat rings to increasing pressure between those walls and ball 14'. However, due to the well known self-energizing action of O-rings, once they are subjected to a small initial pressure, and also due to the fact that they provide a highly concentrated annular area of contact, approaching line contact, very little force is required to effect the desired sealing pressure. Also, as in the previously described embodiment, the controlling or adjusting force is exerted directly downward by the nut 70 on retainer elements 91. Thus, pressure is developed evenly around the circumference of the seat rings, and no force is transmitted through the ball in a manner to cause excessive concentration of pressure on the lower portions of the rings with resultant undesirable binding of the rings against walls 46 and resistance to even adjusting movement of the rings. Due to the features just described, as a result of which only a small amount of force need be exerted by bonnet nut 70 to accomplish effective sealing action, the nut ordinarily may be adjusted merely by hand turning. The need for applying only a small amount of force to accomplish the desired sealing action has the further advantage, particularly important in all-plastic constructions, that the stresses imposed on the valve body and other parts may be held to such low values as to avoid the possibility of distortion of the valve parts due to cold flow of the plastic materials employed. A still further advantage of employing O-ring type seat rings as in the presently described embodiment is that, due to the concentrated area of sealing contact, maximum sealing effectiveness may be obtained with minimum overall resistance to rotation of the spherical plug. This is especially true when the O-rings are made of Teflon, due to its anti-frictional characteristics. Consequently, valves constructed in accordance with the present invention are exceptionally easy to operate.

When the valve is connected in a fluid line and subjected to the line pressure, the O-rings having been subjected to initial energizing pressure by adjustment of bonnet nut 70, the line pressure will be applied to the O-rings as indicated by the arrow 95 in the detailed view of FIG. 5. This will increase the pressure of each O-ring against the inner surface of its associated retainer element 91, and, in a manner well known to those skilled in the art, will tend to produce some compression and deformation of the O-ring cross section. As a result of this latter, the contact pressure between the O-ring and the back face 46 of the recess 43 in which it is disposed will be increased, and also a portion of the O-ring will be wedged, in the direction of arrow 96, into the narrowing space between ball 14' and retainer element 91. Thus, a tight seal is effected to prevent leakage of fluid past the O-ring into valve chamber 13'. Such sealing action takes place around both ports 42 when ball 14' is in its open position as illustrated. Like sealing action takes place on the upstream or high pressure side of the ball when it is rotated 90° to closed position, so that this sealing action together with the blocking action of a solid spherical face of the ball itself completely closes off the flow passage through the ball. In this latter case, the fluid pressure against the solid face of the ball on the up-stream side tends to force the ball toward the down-stream side, so as to mechanically increase the sealing pressure on the down-stream O-ring. This provides double assurance against leakage of fluid through the valve or into the valve chamber 13' when the valve is closed.

As above suggested, some deformation of the O-rings occurs and is desirable to increase the effectiveness of the sealing contact around ports 42. However, due to repeated pressurizing and depressurizing, or due to continued application of relatively high pressure during extended periods of service, the rings may become permanently deformed in a manner and to an extent such that their sealing effectiveness becomes impaired. Similar impairment also may result from wear of the O-rings in the areas of their contact with ball 14' due to repeated opening and closing of the valve. With a valve constructed in accordance with the present invention, such impairment, whether due to the causes just mentioned or to other changes in operating conditions over an extended period of service, may be easily corrected, even while the valve continues to be subjected to line pressure. This is accomplished simply by adjusting bonnet nut 70, exteriorly and from the top of the valve, to force retainer elements 91 farther down in the converging recesses 43 so as to increase the wedging action and thereby the sealing pressure on O-rings 90. In addition to the convenience and ease of manual control of sealing effectiveness afforded by valves constructed in accordance with the present invention, there is the further advantage that such control may be accomplished much more dependably and accurately than would be possible with springs or other self-adjusting means, disposed within the valve bodies and inaccessible from the exterior thereof, such as have been employed in some past plug valve constructions.

Under some circumstances, over long periods of service under operating conditions the limit of the adjusting range of bonnet nut 70 eventually may be reached so that it no longer is possible to maintain the full sealing effectiveness of O-rings 90 which have become excessively worn or deformed in the course of such service. It then becomes necessary to replace the O-rings. However, as with the first described embodiment of the invention, this may be accomplished simply and easily without the necessity for disconnecting the valve from the pipe or conduits of the fluid line or otherwise disassembling the system in which the valve is installed. To this end, handle 84 is removed from valve stem 77 and bonnet nut 70 is screwed out of its socket in the top of the valve body. Ball 14' together with the O-rings 90 and their retainer elements 91 then are removed from valve chamber 13' through access opening 67, as suggested by the exploded view of FIG. 4. New O-rings, which may be standard, off-the-shelf items, are simply slipped into the openings in the retainer elements to replace the old ones, and the ball, retainer elements and O-rings are reassembled and inserted as a unit, manually held together, into valve chamber 13'. Both withdrawal of this assembly from the valve body, and replacement of the assembly so that the retainer elements slide easily into their respective recesses 43, are readily accomplished with the retainer elements and O-rings disposed in position around the openings at the opposite ends of the bore 76 in the ball and with the ball disposed so that the axis of bore 76 is parallel to the axis of ports 42 and the flow passages of the valve body. After the ball and sealing devices are replaced in the valve body, bonnet nut 70 is assembled over stem 77 and screwed down into its socket in the valve body until the desired amount of sealing pressure is applied to the O-rings in the manner previously described. Thus, it will be seen that replacement of the O-rings may be accomplished quickly and easily, and with manipulation of only a minimum number of parts.

The present invention is not limited to the details of the exemplary embodiments herein described and illustrated. For example, certain features of the embodiment just described may be applied to advantage in the first-described embodiment, and vice versa. Also, the invention may be incorporated to equal advantage in multiport valves, i.e., those having more than the two ports of the illustrated embodiments. These and other modifications no doubt will suggest themselves to those skilled in the art, as the result of the foregoing disclosures and explanations. It, therefore, is intended that such modifications as do not depart from the true spirit of the present invention shall be included within the scope of the appended claims.

What is claimed is:

1. A plug valve comprising a valve body having a plug receiving chamber therein, an access opening in a side of said body in communication with said chamber and through which the hereinbelow specified plug and sealing devices may be removed, and aligned flow passages substantially perpendicular to the axis of said opening and terminating at their inner ends in ports respectively in two opposite walls of said chamber, which walls include smooth, flat bearing surfaces respectively surrounding said ports and oppositely inclined relative to a plane extending perpendicular to the axis of said passages so that said surfaces diverge from each other to provide a wedge-shaped plug-receiving socket which expands toward the opening; a spherical plug having a bore therethrough, disposed rotatably in said chamber for movement of said bore into and out of alignment with said passages to control fluid flow through the valve, and having means associated therewith accessible on the exterior of the valve for rotating the plug; a pair of sealing devices interposed respectively between the plug and each of said chamber walls and slidably engaging said bearing surfaces so as to be movable generally toward and away from said opening, each of which devices comprises a seat ring of deformable material in pressure sealing engagement with both said plug and an opposed surface of the valve body around a respective one of said ports and a retainer element therefor of rigid construction having an openning extending axially therethrough in which said ring is disposed removably and sufficiently loosely to permit axial movement of the ring relative to the retainer element, the defining wall of which opening extends completely around said ring and is of sufficient axial extent to enclose at least substantially the whole of the outer periphery of the ring; and bonnet structure secured in closing relation to said access opening and removable to permit withdrawal of said plug and sealing devices through the access opening; said plug being free to move relative to said bonnet structure and the valve body under the positioning control of said sealing devices; said bonnet structure including adjustment mechanism operable to effect selective control of the sealing pressure on said seat rings, which mechanism comprises rigid structure, distinct from said plug, directly engageable with said retainer elements and operable independently of the plug to force said sealing devices, and thereby the plug, in the direction of convergence of said bearing surfaces so as thereby to wedge said seat rings and plug between said surfaces and impose sealing pressure on the seat rings, said adjustment mechanism further comprising a control element distinct from said plug and accessible for adjustment exteriorly of the valve body, and means distinct from the plug and independent thereof affording an inflexible connection between said control element and said rigid structure for effecting said operation of the rigid structure in response to adjustment of the control element.

2. A plug valve as defined in claim 1, wherein the said force applying rigid structure, control element and inflexible connection means of said adjustment mechanism are arranged to apply force on portions of said seat ring retainer elements which are adjacent said valve body access opening.

3. A plug valve as defined in claim 1, wherein each of said seat rings is in the form of an O-ring and each of said seat ring retainer elements is shaped and arranged so as to prevent contact of the retainer element with the surface of said spherical plug.

4. A plug valve as defined in claim 3, wherein each said O-ring is of uniform circular cross-section throughout its annular extent and each said retainer element has uniform axial thickness around said opening therethrough, which thickness is substantially equal at least to the thickness of said O-ring.

5. A plug valve comprising a valve body having a plug receiving chamber therein, an access opening in one side of said body in communication with said chamber and through which the hereinbelow specified plug and sealing devices may be removed, and aligned flow passages substantially perpendicular to the axis of said opening and terminating at their inner ends in ports respectively in two opposite walls of said chamber, which walls include smooth, flat bearing surfaces respectively surrounding said ports and oppositely inclined relative to a plane extending perpendicular to the axis of said passages so that said surfaces diverge from each other to provide a wedge-shaped plug-receiving socket which expands toward the opening; a spherical plug having a bore therethrough, disposed rotatably in said chamber for movement of said bore into and out of alignment with said passages to control fluid flow through the valve, and having means associated therewith accessible on the exterior of the valve for rotating the plug; a pair of sealing devices interposed respectively between the plug and each of said chamber walls and slidably engaging said bearing surfaces so as to be movable generally toward and away from said opening, each of which devices includes a retainer element of rigid construction having an opening extending axially therethrough and a seat ring removably disposed in said opening and completely surrounded by the retainer element, each said seat ring being composed of deformable material and being in pressure sealing engagement with both said plug and an opposed surface of said valve body around a respective one of said ports; and bonnet structure secured in closing relation to said access opening and removable to permit withdrawal of said plug and sealing devices through the access opening, which said bonnet structure includes a rigid element distinct from said plug and operable independently of the plug to effect selective control of the sealing pressure on said seat rings, a part of which rigid element on the interior of the bonnet structure is arranged to bear directly on said retainer elements so as to apply force thereon in the direction of convergence of said bearing surfaces and another part of which rigid element is accessible exteriorly of the valve body for effecting said operation of said rigid element by adjustment of said force.

6. A valve construction as defined in claim 1, wherein the said force applying rigid structure is operably connected to move said sealing devices in the direction of divergence as well as in the direction of convergence of the bearing surfaces of said wedge-shaped socket.

7. A plug valve as defined in claim 1, wherein said bonnet structure includes a main closure member and said adjustment mechanism comprises a nut extending through said main closure member in screw threaded engagement therewith and having a bore through which extends a stem for operating said plug.

8. A plug valve as defined in claim 7, wherein said adjustment mechanism comprises also an operating element rotatably mounted on said nut interiorly of said main closure member and having portions projecting in opposite directions into engagement with slots formed respectively in portions of said retainer elements, whereby rotation of said nut in opposite directions may produce movement of said sealing devices either toward or away from said access opening.

9. In a plug valve construction, a valve body having an access opening in a side thereof, a plug receiving chamber therein communicating with said opening, and aligned flow passages substantially perpendicular to the axis of said opening and terminating at their inner ends in ports respectively in two opposite walls of said chamber, which walls include smooth, flat bearing surfaces respectively surrounding said ports and oppositely inclined relative to a plane extending perpendicular to the axis of said passages so that said surfaces diverge from each other in the direction of said opening in a manner to provide a wedge-shaped plug receiving socket which expands toward the opening; a spherical plug having a bore therethrough and disposed rotatably in said chamber for movement of said bore into and out of alignment with said passages to control fluid flow through the valve, which plug is so formed that the rims of the openings at the opposite ends of said bore lie in planes which are oppositely inclined relative to a plane extending perpendicular to the axis of said bore and the inclined planes of said openings extend substantially parallel to the respectively opposed ones of said bearing surfaces when said bore is in alignment with said flow passages; a pair of sealing devices interposed respectively between said plug and each of said chamber walls and slidably engaging said bearing surfaces so as to be movable generally toward and away from said access opening, each of which devices includes a retainer element of rigid construction having an opening extending axially therethrough and a seat ring removably disposed in said retainer element opening, each said seat ring being in the form of an O-ring of uniform circular cross-section and composed of deformable material, and each said seat ring having pressure sealing engagement with both said plug and an opposed surface of said valve body around a respective one of said ports; means accessible on the exterior of the valve for rotating said plug; bonnet structure secured in closing relation to said access opening and removable to permit withdrawal of said plug and sealing devices through said opening; and means distinct from the plug, accessible on the exterior of the valve and operable independently of the plug to apply force on said sealing devices in the direction of convergence of said bearing surfaces so as to wedge the sealing devices and plug between said surfaces and thereby impose sealing pressure on said seat rings.

10. A plug valve adapted for corrosive fluids and comprising: a one-piece molded valve body having a plug receiving chamber therein and an access opening in one side thereof in communication with said chamber, a one-piece molded spherical plug rotatably disposed in said chamber and having an integral stem, and a one-piece molded bonnet member in screw-threaded engagement with said body to close said opening and through which said stem projects, said body, plug and bonnet member all being composed of rigid plastic material having corrosion resistance properties; said body also having aligned flow passages extending substantially perpendicular to the axis of said access opening and terminating at their inner ends in ports respectively in two opposite walls of said chamber, which walls have recesses therein opening toward the interior of said chamber and toward said access opening and at the rear of which recesses are smooth, flat bearing surfaces respectively surrounding the ports in said walls, said surfaces being oppositely inclined relative to a plane extending perpendicular to the axis of said flow passages and diverging from each other in the direction of said opening to provide a wedge-shaped plug receiving socket which expands toward said opening; said plug having a bore therethrough and being rotatably disposed in said chamber for movement of said bore into and out of alignment with said passages, said plug also being so formed that the planes of the openings at the opposite ends of said bore are inclined relative to each other and extend substantially parallel to the respectively opposed ones of said bearing surfaces when said bore is in alignment with said passages; a pair of sealing devices slidably disposed respectively in said recesses, each of which devices includes a retainer element of rigid corrosion resistant plastic material having an opening therein and a seat ring removably disposed in said retainer element opening and having sealing engagement with both said plug and a surface of said valve body around a respective one of said ports, each said seat ring being in the form of an O-ring of uniform cross-section and composed of polytetrafluoroethylene material; said bonnet member having means on the interior thereof engageable with the retainer elements of said sealing devices and operable to apply force thereon in a manner to effect movement of said devices and said plug in the direction of convergence of said bearing surfaces so as thereby to impose sealing pressure on said seat rings, said bonnet member also having means on the exterior thereof for rotating the member to effect controlled application of such force on the sealing devices.

References Cited in the file of this patent

UNITED STATES PATENTS

| | | |
|---|---|---|
| 1,941,839 | Johansson | Jan. 2, 1934 |
| 2,480,529 | Waag | Aug. 30, 1949 |
| 2,603,449 | Overholser | July 15, 1952 |
| 2,832,562 | Myers | Apr. 29, 1958 |
| 2,919,886 | Hurst | Jan. 5, 1960 |
| 3,081,792 | Hansen | Mar. 19, 1963 |

FOREIGN PATENTS

| | | |
|---|---|---|
| 403,389 | Great Britain | Dec. 18, 1933 |
| 723,306 | Germany | Aug. 1, 1942 |